United States Patent
Lungu

(10) Patent No.: US 6,864,657 B1
(45) Date of Patent: Mar. 8, 2005

(54) METHOD AND CIRCUITS FOR CONTROLLING THE POWER OF AN ELECTRONICALLY SWITCHED, TWO-PHASE RELUCTANCE MACHINE

(76) Inventor: Iancu Lungu, Str. Trappezului nr. 5, G1A ap-40, RO-74381 Bukarest (RO)

( * ) Notice: Subject to any disclaimer, the term of this patent is extended or adjusted under 35 U.S.C. 154(b) by 0 days.

(21) Appl. No.: 09/744,645

(22) PCT Filed: Apr. 21, 2000

(86) PCT No.: PCT/RO00/00011

§ 371 (c)(1), (2), (4) Date: Aug. 22, 2001

(87) PCT Pub. No.: WO00/74205

PCT Pub. Date: Dec. 7, 2000

(30) Foreign Application Priority Data

May 26, 1999 (RO) .............................. 99-00602

(51) Int. Cl.⁷ ............................................. H02P 7/05
(52) U.S. Cl. ....................... 318/701; 318/254
(58) Field of Search .................. 318/254, 685, 318/696, 701

(56) References Cited

U.S. PATENT DOCUMENTS

| | | | | |
|---|---|---|---|---|
| 4,598,240 A | * | 7/1986 | Gale et al. | 318/254 |
| 6,046,561 A | * | 4/2000 | Zup et al. | 318/439 |
| 6,081,083 A | * | 6/2000 | Nashiki | 318/254 |
| 6,262,510 B1 | * | 7/2001 | Lungu | 310/254 |

* cited by examiner

*Primary Examiner*—Bentsu Ro
(74) *Attorney, Agent, or Firm*—Kelly Lowry & Kelley, LLP

(57) ABSTRACT

The present invention provides principles and circuits for the power control of two-phase switched reluctance machines featuring a direct recovery of the phase switch-off energy and a 180° phase angle at full load. The power control method of the present invention does not require any supplementary power switches and acts through the logic circuitry upon the existing power switches of a motor which formerly did not exhibit a power control. The power control relies physically on a shorter current flow or duty cycle after the phase beginning. This can be done either through mechanical phase shift of a second Hall sensor or by using time delay circuits.

30 Claims, 4 Drawing Sheets

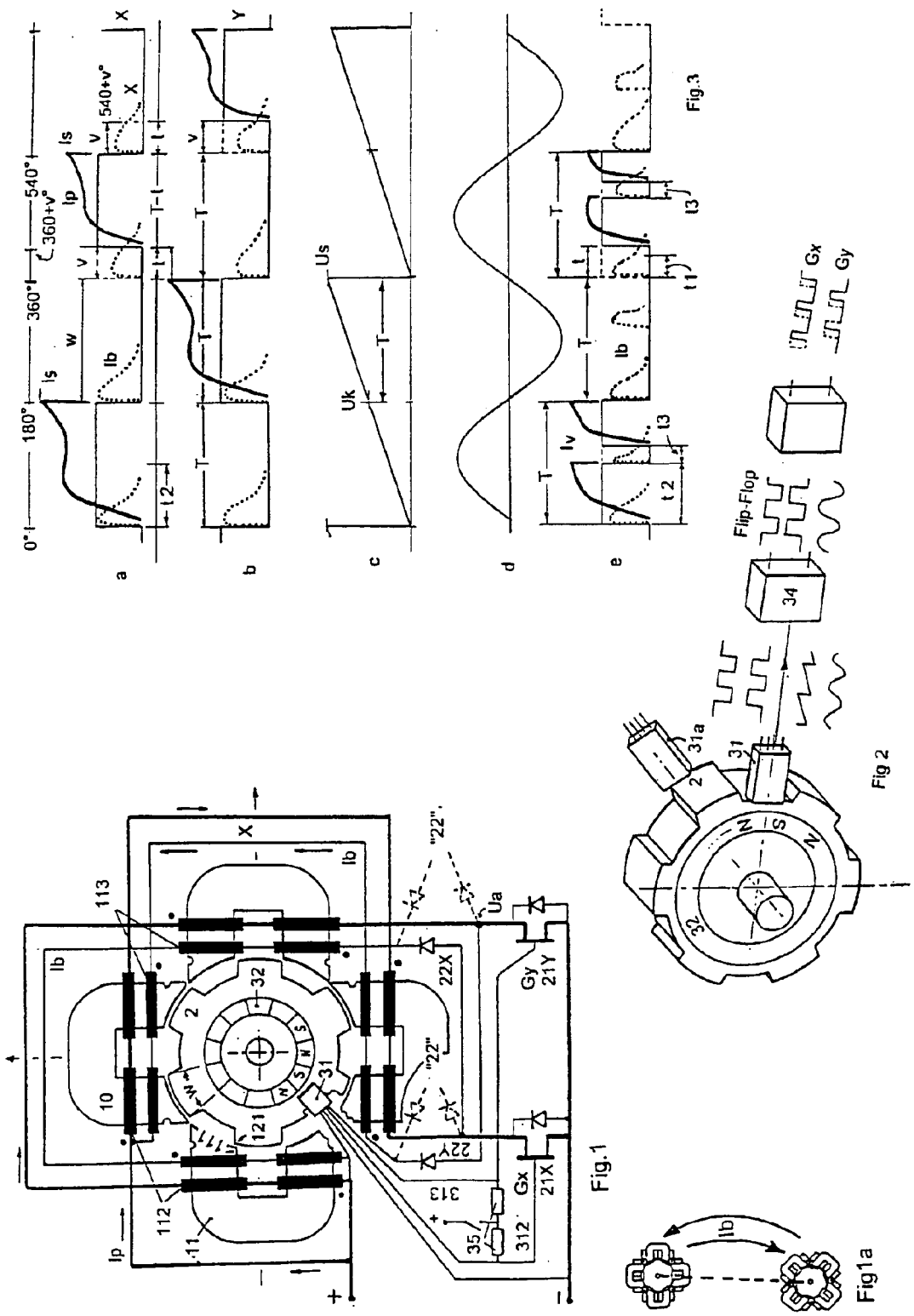

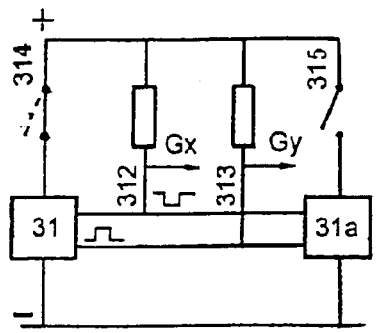
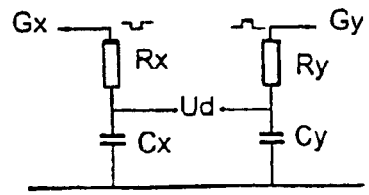
Fig.7
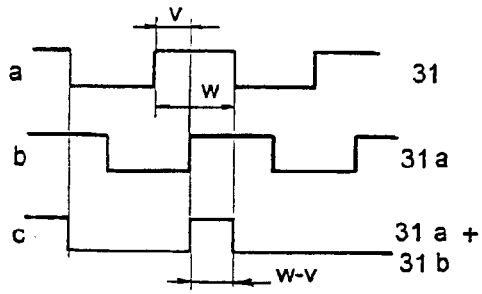
Fig.4
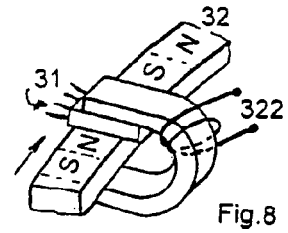
Fig.8
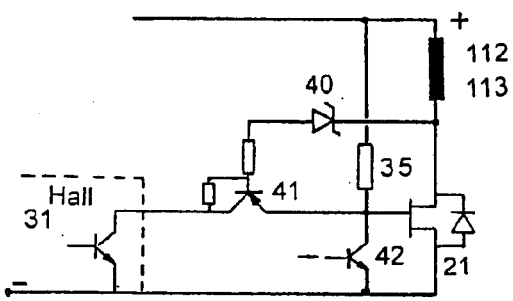
Fig. 9
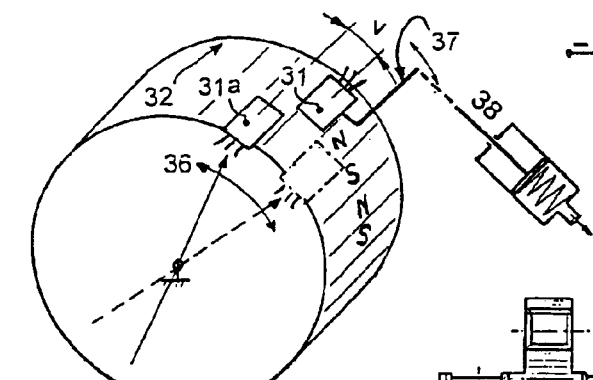
Fig.5
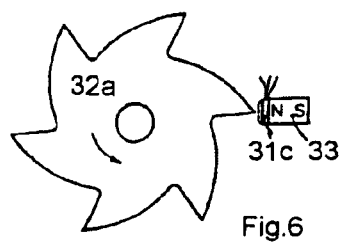
Fig.6
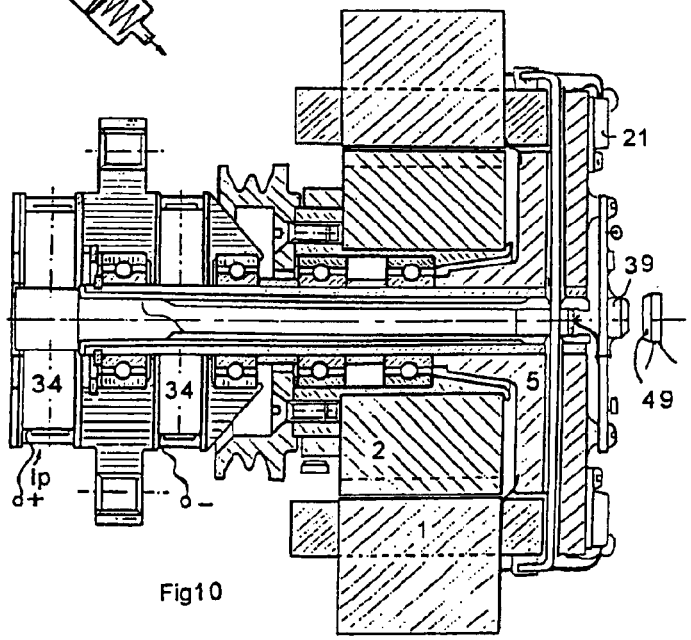
Fig10

METHOD AND CIRCUITS FOR CONTROLLING THE POWER OF AN ELECTRONICALLY SWITCHED, TWO-PHASE RELUCTANCE MACHINE

BACKGROUND OF THE INVENTION

The invention relates to electronically switched, two-phase reluctance machines (motors or generators, also called SR machines—switched reluctance machines) which have a particular magnetic circuit as know, for example, from the international patent applications WO 96/09683 and WO 98/23024.

Because of the magnetic circuits known from the prior art which allow a very simple, highly efficient recovery of the demagnetization energy of a just switched-off phase, up to now the instantaneous supplying of the second motor phase with current had to take place at the moment of the switching-off of the first one.

In order to achieve a power control, it has been proposed to interrupt the main current before the end of the phase. The current flow in this phase to be switched-off should be maintained up to the end of the phase duration due to the feedback of the self-induction voltage by means of two additional power transistors, such as that disclosed in WO 96/409683. These power transistors were also necessary in case of a regulation by the known pulse width modulation.

If the feedback of the self-induction voltage over the transistors would have been renounced to, this would have resulted in a waste further transmission of the by-pass current to the other phase of the wrong moment, with serious consequences for the efficiency. Up to now it was thus not possible, without additional expenditure of power electronics, to realize a power control based-on the reduction of the duty cycle of the power switches.

SUMMARY OF THE INVENTION

The aim of this invention is to indicate possibilities of the power control of SR machines without additional expensive power semi-conductors. It should be considered here that the efficiency of the machine should remain as high as possible. This means that the recovery of the demagnetization energy should take place efficiently and that the losses of the power electronics should be minimized. The present invention achieves this objective by reducing the main current duration at the beginning of the phase, instead the end of the phase as in the prior art, reducing the expenditure of electronics and achieving a control in wider limits.

BRIEF DESCRIPTION OF THE DRAWINGS

FIG. 1 shows a simple motor in a compressed form (magnetic and electronic circuit);

FIG. 1A illustrates possible current paths to the secondary windings of a second machine;

FIG. 2 shows an outline of the arrangement of a few components which are relevant to the invention with the signal forms for the motor control which appear during operation of the invention;

FIG. 3 shows the relevant control signals of the motor as pulses;

FIG. 4 illustrates a simple power control using two phase-shifted rotor position Hall sensors with digital open-collector outputs, and the signals generated thereby;

FIG. 5 illustrates the movement of a lever and thus movement of a Hall sensor to alter the power of the motor;

FIG. 6 illustrates a magnetic saw toothed disk that rotates together with the rotor;

FIG. 7 is an electronic circuit used in accordance with the present invention;

FIG. 8 illustrates a current loop inserted in the magnetic circuit of the transmitting magnet to substantially improve starting behavior in accordance with the present invention;

FIG. 9 illustrates an electronic circuit incorporating a transistor for protective purposes in accordance with the present invention;

FIG. 10 is a cross-sectional view of a motor embodying the present invention;

DETAILED DESCRIPTION OF THE PREFERRED EMBODIMENTS

Figure 11:
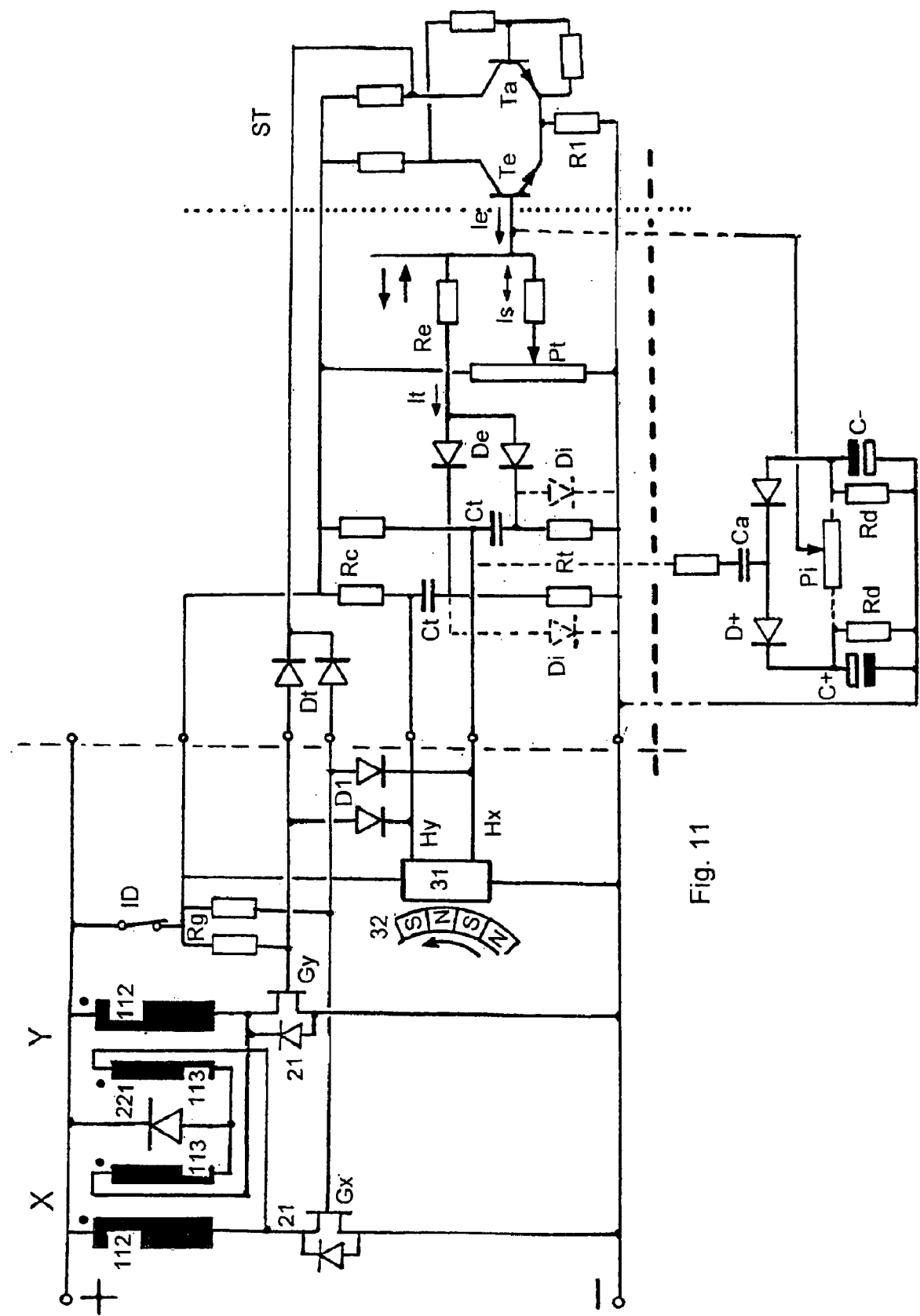
FIG. 11 is an exemplary circuit used in accordance with the present invention.

FIG. 1 shows such a simple but operative motor, for an easier understanding in a compressed form (magnetic circuit and circuit). Each individual of the eight main windings (112) and secondary windings (113) is represented as an inductive resistor fixed on the sketched magnet yoke 11. The main current paths (see ""definitions"") are represented by fat or thicker lines in the accompanying drawings. The simplest circuit (see FIG. 1) of an uncontrolled SR motor works in the sense of the invention, as known from the prior art, with a Hall sensor 31 with two complementary ""flip-flop"" open-collector outputs 312, 313 as phase control which has been realistically sketched in the vicinity of the rotor. The gate electrodes of the power switches 21X, 21Y, which receive voltage for example over the polarization pull-up resistor 35, are alternatively short-circuited to the minus potential (ground) over the Hall sensor outputs 312, 313 so that the main current is thus interrupted. For an uncontrolled motor, the phase X receives current at the electrical angle 0°, see FIG. 3 for example, and at 180° its main current is interrupted; simultaneously, the Y-phase receives current, namely up to 360° (=0°) so that the electric cycle is closed. The observance of the electric switching points (phase commutation) which correspond to the tooth-to-tooth movement of the rotor is important so that the stator 111 which comes close and the rotor poles 121 can attract each other efficiently, see FIG. 1, phase X.

Definitions

To simplify, in the course of the specification, the semi-conductor components such as the MOS-FETs, the IGBTs which conduct the main current from the source of the current to the windings are called ""Power switches"".

Under main current, in the sense of the invention, we understand the current which flows from the source to the windings over a power switch. The flow duration of the main current is the same as the phase duration T under full load (flip-flop operating mode of the power switches) and, considered as an electrical angle, amounts to 180°. The phase commutation is carried out by means of a rotor position magnet 32 which rotates in front of one or several rotor position Hall sensors 31.

FIG. 2 shows an outline of the arrangement of a few components which are relevant to the invention with the"

signal forms for the motor control which appear in the course of the invention.

As "phase control", see FIG. 2, we understand the circuit parts which control the phase commutation in flip-flop mode. This mode must take place in the rotor positions in which the efficiency of the commutation electrical/mechanical energy is optimal for the predetermined operating parameters.

Although a slight power control can also be achieved over the phase control adjustment, in the sense of the invention, we understand hereunder a reduction of the main current running periods over shorter gate pulses. This means that the circuit parts which form gate control signals from rotor position signals which are rectangular and have a duration less than the phase length, as represented in FIG. 2 on the right, belong to the power control.

The diodes which feed the self inductance voltage Ua which occurs at the connection between the power switches and the windings during the interruption of the main current (the demagnetization energy or bypass current lb) to the subsequent phase are called "by-pass diodes". "Phase angle w" (electrical=180°, number of the rotor teeth) is the rotor angle which is passed through between two phase commutations, i.e. between two switching operations of the phase control (Hall sensor).

"Tooth-to-tooth" or "maligned position" is the relative rotor-to-stator position in which the rotor 2 rotates in case continuous current flows continuously through a phase (minimal reluctance).

The aim of this invention is to indicate possibilities of the power control of said SR machines without additional expensive power semiconductors. It should be considered here that the efficiency of the machine should remain as high as possible. This means that the recovery of the demagnetization energy should take place efficiently and that the losses of the power electronics should be minimized.

The aim of the invention is achieved according to the teaching of the main claim. The skilled in the art are given a choice of simple circuit indications and examples in order to combine them like modules when configuring an appropriate circuit alternative in order to realize a concrete target in the sense of the invention. Under "power control" of a SR machine, especially of a motor, we understand in the sense of the invention the reduction of the main current by appropriate short-time locking within the phase duration (the phase angle). This causes the reduction of the main current angle to less than 180° or that the reduction of the relative duty cycle of the power switches. This means that for the control both switches do no work in push-pull mode ("flip-flop") any longer. FIG. 3 shows the relevant control signals of the motor as rectangular (voltage) pulses. The corresponding paths of the main current lp (shown as thicker lines in FIG. 3) or of the by pass current lb (dotted line in FIG. 3) are represented superimposed. The form of the pulses in controlled mode is represented on the right side (from 360°), those in uncontrolled (flip-flop) mode on the right side (0–180°).

Because of the magnet circuits known from the prior art which allow a very simple, highly efficient recovery of the demagnetization energy of a just switched-off phase, up to now the instantaneous supplying of the second motor phase with current had to take place at the moment of the switching-off of the first one (flip-flop mode; "interlinking" of the phases over the bypass current).

In order to achieve a power control, it has been proposed there to interrupt the main current before the end of the phase. The current flow in this phase to be switched-off should be maintained up to the end of the phase duration due to the feedback of the self-induction voltage Ua by means of two additional power transistors 211, see WO 96/096683, pages 8–9. These power transistors 211 were also necessary in case of a regulation by the known pulse width modulation.

If a feedback of the self-induction voltage over the transistors 211 would have been renounced to, this would have resulted in a waste further transmission of the bypass current to the other phase at the wrong moment, with serious consequences for the efficiency. Up to now it was thus not possible, without additional expenditure of power electronics, to realize a power control based on the reduction of the duty cycle of the power switches 21.

A simpler solution is possible according to the teaching of this invention, even if there are no flyback power transistors 211 (see WO 96/09683) which supplied, at the end of the phase duration, the demagnetization energy for the locking of a power switch 21X to the phase X from which they come, as follows.

After the start of the motor which always takes place in the "flip-flop" operating mode (FIG. 3, left side) of the power switches, the main current can be delayed by a fixed or variable space of time by maintaining locked the power switches 21X. 21Y after the phase commutation (see FIG. 3, on the right), this space of time corresponding to an electrical angle depending on the number of revolutions of the motor. The main current of the phase X thus does not start at 360° any longer but starts delayed at 360°+v°, that of the Y phase at 540+v°. The locking of the power switches takes place as before at n×180°, i.e. at a relative position of the stator/rotor teeth 111–121 in which they can efficiently attract each other efficiently, see phase X in FIG. 1. The demagnetization energy (the bypass current lb, path see FIG. 3 dotted line) can thus be supplied to the following phase over the bypass diode 22 with an useful effect (as magnetizing current, accompanied by a torque), even if the main current has not yet started to flow. If the main current lp begins to flow delayed after the time t (electrical rotor angle v), its rise becomes steeper, since the corresponding magnet yoke 11 is already premagnetized over the bypass current. This means that an appropriate locking of the power switch 21 of the Y phase can be used for example in order to obtain an appropriate premagnetization of the Y phase over the diode 22X because of the "interlinking" of the phases over the bypass current. Because of the control of this phase switching processes, besides a power control, a certain current circuit in the phases can be achieved which is favorable for an optimal efficiency and/or for noise reduction.

Considering the findings of this invention, namely essentially that the reduction of the main current duration has taken place at the beginning of the phase and not at the end of the phase as in the prior art, not only the expenditure of electronics is reduced but a control is achieved in wider limits.

The variable rise-delay time t of the power switches 21 can take place electronically or over the mechanical displacement of a second Hall sensor 31a. This can be achieved electronically with a rise-delayed time function element which is set into operation at the time of the phase commutation and which holds the gate electrodes of the power switches 21 around the space of time t on the minus potential after the phase commutation (see FIG. 3). This delay can take place with parameters, can thus be adjusted for example over a circuit which compares a nominal value with the actual value and correspondingly corrects it in order to maintain constant a determined controlled variable such as the number of revolutions or the torque. Thus, for an increase of the number of revolutions, the delay t should be increased in order to thus reduce the main current until the number of revolutions decreases to the set value. If the delay t is constant, a certain limitation of the number of revolutions increases, the relative duty cycle (the power draw) of the motor will decrease until there results a limitation of the number of revolutions. This takes place because, for a higher number of revolutions, the phase duration T decreases, while the delay t remains constant so that the relative duty cycle T—t decreases. The ratio main current angle/phase angle is reduced.

A simple power control for which this ratio remains constant can be achieved by using two phase-shifted rotor position (Hall) sensors 31 with digital open-collector outputs 312, 313 (see FIG. 4). In this connection, the gate electrode of the power switches 21 is switched over the first Hall sensor (31) to the high saturation potential and short-circuited "low" to the minus potential by the second Hall sensor 31a (the outputs of which are connected in parallel).

In the lower half of FIG. 4, in plane a, the signals of an output 312 of the active Hall sensor 31 (control signals of the gate GN when the switch 314 is open and 315 closed) are indicated, or in plane b those of the output of the Hall sensor 31a (switch 315 open, 314 closed). In plane c, the resulting X gate signal (reduced power) is indicated, when both switches are closed.

The high pulse width of the Y-phase is identical, however electrically phase-shifted by 180°. If the signals of both Hall sensors are phase-shifted by the angle v, the angle while the gate electrode is high (=main current angle) is always w-v (phase angle - phase offset of the Hall sensors).

For the motor of an electric tool, this power control can possibly be more favorable. For common manual tools, an increase of the number of revolutions takes place by further pushing of the motor close switch which is integrated into the handle which, in this case, contains a potentiometer. Such a switch can also cause, for example over a lever, the movement of a Hall sensor so that the function of the power control of the tool (see FIG. 5) can be represented as follows.

Depending on the desired direction of rotation, the position for a starting sensor 31a opposite the transmitting magnet 32 is predetermined by means of the bistable left/right selection lever 36, with breakover points which are situated approximately in the first quarter of the phase angle, on the left or on the right of the neutral tooth-to-tooth position.

At the beginning of the stroke of the lever 37, the starting Hall sensor 31 a is activated, as shown in FIG. 3, and the motor starts in the preselected direction. After having reached the lower limit of the number of revolutions, the second Hall sensor 31 is activated which however shows the maximal angle offset v so that the main current angle is small and the motor works with a minimal power (or number of revolutions). By pushing further the lever 37, one of the Hall sensors 31 is moved, as shown in FIG. 5, so that the offset v reduces so that the main current angle increases and thus the power of the motor. If the phase offset of both Hall sensors 31 is the same, the motor works at full load (the main current angle and the phase angle are the same, flip-flop mode).

For a few applications (vacuum cleaner for example), the movable Hall sensor 31 can be displaced depending on the output of a driven device (vacuum, flow, temperature, current, oscillation), for example for pressure by means of a cylinder/piston/spring device 38, that allows particularly low-cost global solutions for the control (see FIG. 6).

For an internal combustion engine of a passenger car for example, which is equipped with a starter according to WO 98/23024, the oscillations of the Otto engine can be attenuated by means of a Hall sensor which is positioned free from rotary oscillations. If the Otto motor with the reluctance starter shows rotary oscillations, they result in that the Hall sensor positioned free from rotary oscillations moves relative to the oscillating stator so that the reluctance machine swings in pendulum fashion between the motor/generator (brake) mode in the sense of a reduction of the oscillations of the Otto engine.

These functions can naturally also be realized electronically so that, instead of a mechanical displacement, electrical phase offsets are used.

For the electronic solutions with time switching, it is basically a matter of controlling longer or shorter main current running periods synchronized to the instantaneous rotor/stator positions which are advantageous for converting the electrical energy into mechanical energy and of adjusting them eventually depending on a nominal parameter (for example, number of revolutions).

Thus, for the machine control, a rotor position signal must be gained which unambigously reflects the angle of rotation and eventually the sense of rotation. This signal can be processed with known electronic means so that control pulses for the power switches 21 can be obtained in flip-flop mode (full load) or in power control mode.

Here, it is irrelevant to know which type of position sensors is used, whereby these position sensors are designated in the course of the specification as Hall sensors 31 (analog, digital, differential, programmable) to simply the matter. The rotor teeth can be directly scanned by means of a differential or of a programmable Hall sensor so that a phase commutation signal can be obtained even without the aid of a transmitting magnet 32. The rotor position can also take place in the sense of the invention without the aid of a sensor by the electronic determination of the reluctance of the motor phases, as known from the prior art.

As FIG. 3 shows, in which the flip-flop phase commutation signal of an uncontrolled motor and the sawtooth signal or sinus oidal signal of a rotor position transmitter are represented as a comparison, from these values not only the phase commutation signals can be gained, but also other control signals. Here, simple electronic means are used such as the Schmitt-trigger. A sawtooth signal of this type can be obtained, for example, by means of an analog Hall sensor 31c which is polarized by a permanent magnet 33 and which is situated radially in front of a soft magnetic "saw tooth disk" 32a which rotates together with the rotor (FIG. 6). This being, the magnetic field which triggers the Hall sensor (the reluctance of the system) changes in the manner of saw teeth so that the output signal of the Hall sensor 31c (=input signal of the phase control trigger) also shows this form. From the sawtooth signal, a phase commutation signal (flip-flop) can be obtained over a level switch 34 (Schmitt-trigger, see FIG. 2 and 3), when the trigger tilts in the middle of the rise phase (level Uk) (phase commutation from X to Y) or falls back to the starting position when the signal decreases after the saw top Us (Y to X), see FIG. 3, compare planes a–c. Due to the adaptation of the sawtooth voltage Uk, the phase symmetry can easily be influenced without the phase position being changed (when falling back after the tooth top). Phase symmetry means that the duration of the high phases on both X and Y outlets, thus on the gate electrodes Gx. Gy of the power switches 21X, 21Y is always the same, either in the flop-flop mode or in the power control mode. This is necessary in order to hold constant the currents of both phases for the steady operation of the machine.

However, should it, for example because of the properties of the components, come to the fact that the high phases at the gate of the power switches 21X, 21Y have a different length, it is possible, for example with the basic circuit according to FIG. 7, to obtain a voltage signal Ud (symmetry difference) which is used for compensating the phase symmetry. By means of this voltage Ud, the sawtooth voltage Uk of the trigger 34 is adapted in such a way that a phase symmetry occurs. The voltage Ud is the potential difference on two capacitors Cx, Cy which are connected with the gate electrodes Gx, Gy of the power switches over the resistors Rx, Ry and which are alternately loaded and discharged and which take up a tension level which corresponds to the ratio of the on/off duration of the respective switch 21X, 21Y. This phase duration signal can be used in flip-flop mode (for example during the run-up period of the machine) as well as an analog speed signal.

These possibilities of influence of the phase commutation can be completed with a dynamic, main current depending alternative (FIG. 8) which can substantially improve the starting behavior. For this purpose, one (or several) current loops 322 (see FIG. 8) is inserted for example in the magnetic circuit of the transmitting magnet (32) Hall sensor (31), this current loop being passed through for example by the main current of a phase or by an appropriate control current. Depending on the momentaneous current flow direction and intensity, the magnetic field which controls the Hall sensor 31 and thus the phase commutation, is influenced so that a feedback takes place in this manner between the main current lp and the phase commutation. Thus, a load depending shifting of the phase commutation points as feedback is possible.

Such a shifting of the phase commutation can also be carried out with phase shifting electronic means (known from the prior art) in wider spheres, when it is useful for the optimalization of the efficiency or for the control of the motor. For this purpose, it is advantageous, for example, to gain a sinusoidal signal (FIG. 3. plane d) from an analog Hall sensor because this signal can be processed more easily for the phase shifting. For example, the means described in connection with FIG. 3 as well as the means for the phase shifting known from the prior art can be used here.

For the start of the motor, a phase commutation in the vicinity of the tooth space is advantageous, position, FIG. 1, corners of the rotor and stator teeth of the X-phase; the shifting of the phase commutation relative to this position should however increase when the number of revolutions increases. For this purpose, it is advantageous, for example, when a bigger phase shifting of the phase commutation is caused by means of a speed (voltage) signal which increases with the switching frequency and which is easy to gain. The amplitude of this shifting will depend on the operating parameters (number of revolutions, torque) for an optimal efficiency.

A possibility to determine this is, the number of revolutions or the load being constant (controlled), to bring the phase shifting as far as the main current lp or the bypass current Lb reaches the lowest value. The latter (lb) can be measured with lower losses, eventually even without losses, over the self-induction voltage Ua.

This efficiency optimization can take place automatically with an appropriate regulator circuit. If, instead of a simple sensor, a programmable Hall sensor which shows adjustable trigger components on the same chip is used, it is possible to definitely reduce the expenditure of the circuit and to control the phase shifting of the output signals with the programming of the sensor. The rotating magnetic field (the motive effect) of the machine develops from the superposition of the main current lp and of the bypass current lb which always arises after the interruption of the main current and which simultaneously passes through the windings of both phases.

For machines such as those which are described in WO 98/23024 which consist of two machine halves (with the same axis, mechanically offset by an angle of w/2 for torque smoothing), it is possible to reduce the peaks of the self-induction voltage Ua by feeding the bypass current lb not only to the complementary phase, thus from X to Y, but also to the phases of the second machine half, see FIG. 1a. The second machine half has the same minus connection as the first one and is identical therewith. In FIG. 1, the diodes 22 which are drawn in oblique dashes show the possible current paths to the secondary windings 113/power switches 21 of the second machine sketched in FIG. 1a.

This means that the bypass current lb of the X-phase is derived to the phases X and Y' (belonging to the second machine) or it is fed only to the Y-phase when this is advantageous for the efficiency. The method is the same for the bypass current lb of the second machine half. The main current as well as the considerably weaker bypass current (see FIG. 3) can be controlled, always depending on each other, in certain limits for the optimalization of the motor function so that, when they are adjusted in this way, losses can be minimized.

The main losses are:
a) Ohmic losses in windings and power switches which substantially depend on the current peaks which thus should be avoided as far as possible.
b) Switching losses which require to avoid too many switching operations.
c) Losses due to peaks of the self-induction voltage (depending on the current peaks) which are absorbed in avalanche mode by the power switches 21 and which endanger them.
d) Iron losses which are connected with the losses under a) and b).

In order to achieve the best possible efficiency, it is thus necessary to obtain with as less switching operations as possible an appropriate flow of the main current lp, i.e. especially to avoid high values at the time of the switching-off. For a few operating states, it is eventually appropriate to take an additional interruption of the main current lp into consideration (see plane e, right side) if high current peaks are thus avoided, whereby there results as a consequence an increase of the efficiency. In this way, the current drawn from the motor has a lower ripple and the electrolytic capacitor which is eventually necessary for smoothing is smaller. FIG. 3 plane (a)–(b) shows typical flows of the main current in an uncontrolled motor or in a motor controlled only over the delay t. The current peaks is at the end of the phase can be reduced, for example, by the fact that the gate of the power switch 21 is short-circuited for the time t3 at the minus potential (ground at the phase position t2 (see plane a and e) where the main current lp has a lower value, what reduces the main current especially in the rear area, see plane e. The power control guarantees that the number of revolutions does not drop and decreases to t1, whereby the main current does on the whole remains at the nominal value, however without the marked peak is, what can contribute to an increase of the efficiency.

In order to limit the starting current of the motor, the main current can be interrupted once or several times for a constant or parametrically variable duration t3 within the phase duration T when reaching a predetermined peak value lv (see plane E, on the left), as shown in FIG. 3, plane e. The delay to the phase beginning does not exist (t=0). The reset of the main current can take place, for example, when the bypass current falls to a predetermined value.

This starting current limitation can also act as a protective function and takes place, for example, by means of a transistor 42, see FIG. 9.

Because the beginning and the end of the phase are predetermined and the windings of the concerned yokes are continuously traversed, either by the main current or by the bypass current, this means no basic abandonment of the flip-flop starting mode.

Without this protective function, it cannot be avoided, especially when starting the motor, that the main current to be switched reaches high values. Thus, the peaks of the self-induction voltage Us also reach very high values which, despite the bypass current lb, excess the electric strength of the power switches 21 (Mosfets, IGBTs). However, the energy of the voltage peaks clamped in the avalanche mode (=avalanche clamping) endangers the power switches. Therefore, it is more advantageous to convert these peaks into heat by triggering the gates, thus by the conductibility of the chips (active clamping). This is carried out by means of the circuit shown in FIG. 9 where the gate will receive a positive potential over the Zener diode 40 and by locking the transistor 41 (21 becomes conducting) as soon as the voltage applied to the power switches 21 approaches the avalanche value and thus excesses the Zener voltage.

As FIG. 9 shows, the gate can be controlled over the open collector output of the Hall sensor 31 (phase control) and additionally over a series (41) or a parallel transistor 42.

The gate control can thus be disconnected from the phase control, if need be, in order to realize, for example, the most important operating and protective functions of the motors such as:
a) Switching on and off
b) Power control and control of the number of revolutions
c) Overvoltage protection as well as undervoltage protection
d) Thermal switching-off, current delimitation and short-circuit protection
e) Protection against inductive voltage peaks as already mentioned
f) Braking The transistor 42 takes up protective functions and should short-circuit the gate at the minus potential in case one of the states mentioned under c) or d) occurs. From WO96/09683, we know a reluctance machine which has no stator but two independent rotors 1, 2, whereby the first one, the field rotor 1 (similar to a rotating stator), is supplied with the main current lp over two brushes 34 or slip rings, as shown by FIG. 10.

The field rotor carries on the frame 5 the power switches 21 and a part of the phase and speed control which are thus movable for adjustment and inaccessible from outside. For this type of adjustments, it is thus necessary to carry out a contactless transmission, for example, of the externally predetermined speed nominal value which is carried out by means of an axially mounted, simultaneously rotating Hall sensor 39 which is triggered by a stationary control winding 49.

By means of these components 39, 49, it is possible, for example, to control the time base which controls the rise-delay time t of the power switches 21 (the power control) which is situated on the simultaneously rotating board 45 of the field rotor 1. The phase control rotates with the field rotor. During the adjusted delay t, the control winding 49 is supplied with current. This winding controls the Hall sensor 39 which controls said power control. Since the time base is controlled by the phase commutation, thus by the steep drop of the main current lp, this process which is easy to recognize electronically could start an external time base. The advantages of the invention are based on the simplicity of the (power) circuits which allow a low-cost realization.

Three circuit examples (FIG. 11, 12, 13) which can be used for the motor according to FIG. 1, will be described hereunder for the speed control. The circuit of the motor has been represented in a simplified way and has been differently completed, depending on the example.

The two bypass diodes (in series with the bypass windings 113) have been replaced by a single diode 221 with the same function, the cathode of which is directly connected with the plus connection. For controlling, the triggering of the gate electrodes of the power switches 21 must be disconnected from the phase commutation at the beginning of the phase.

In order to cause a delay, it is most simple to combine a RC-module set into operation by the phase control with a level discriminator (trigger) so that a low signal arises at the output of the trigger during the delay t, this signal switching "low" the gate of the power switch of the active phase of the motor. The switching-off of a phase (commutation high-low) must thus trigger the rise-delay time t of the power switch 21 of the next phase.

FIG. 11 shows a realization example of the invention between the circuit of a motor (on the left of the dashed line) and the level switch (here as a Schmitt-trigger, on the right of the dotted line). The motor with two phases X and Y has main windings 112 in series with the power switches 21 (both provided with an inverse diode) which are traversed by the bypass current lb which flows through the bypass diode 221 to the plus line. The gate electrodes Gx, Gy of the power switches 21 are pulled up by the resistors Rg in case the on/off switch lD is closed. They are pulled down to the minus potential by the digital Hall sensor 31 with complementary (flip-flop) outputs Hx, Hy (=phase control), no longer directly but over the diodes D1. Up to here, the function is the same as that of an uncontrolled motor.

The complementary outputs Hx, Hy of the Hall sensor 31, in front of which the transmitting magnet 32 rotates, are connected to the pull-up resistors Rt in order to obtain signals for the control. During the "high" period of the outputs Hx, Hy of the Hall sensor 31, the capacitors Ct are charged by these resistors. The charging can be accelerated over the diodes Dl (dotted line), if need be, for improving the control behavior.

If one of the open-collector outputs Hx, Hy of the Hall sensor 31 becomes "low", the respective capacitor Ct discharges over this output or over the series resistor Rt, whereby the latter form RC modules (rt, Ct) which determine the delay t for each phase for the speed control.

During the phase commutation, an asymptotic decreasing minus potential Ut occurs at the connection Rt-Ct.

This negative voltage which comes from either the X-phase or from the Y-phase causes over the diodes De and the resistor Re a current ft which tilts the. Schmitt-trigger ST. Thus, the output transistor Ts becomes conducting. Thus, the respective gate electrode of the active power switch 21 remains connected with the minus potential for the time t over the diodes Dt or the transistor Ta and the low-impedances resistor Rl, even after the phase commutation, thus "low".

The delay t of the main current lp is adjusted by the potentiometer Pt which conducts an adjustable current is in direction of the base of the input transistor Te (nominal value adjustment).

The substraction of the nominal value current is and of the time variable current it results in a resulting base current le. When this current reaches the threshold value, the transistor Te becomes conducting, whereby the output transistor Ta blocks so that the respective gate of the power switches 21 can be pulled up over the resistance Rg.

The power switch 21 is thus conducting, the main current lp thus begins to flow in the sense of the invention after the delay.

The speed control circuit (on the right of the dashed line) can be fixed on a separate board which can be connected with an uncontrolled motor (for example over a plug-in connection). The same is also valid for the circuit according to FIG. 12.

At the input of the Schmitt-trigger, influence can be exerted in many ways on the base current le in order to improve the functions of the control or to protect the motor. Here (see arrows), a pilot current can be fed in or drawn, either in order to influe on the delay t (feedback functions for example), or to stop the motor in case of an endangering due to the permanent blocking of the input transistor Te. The delay t (the speed of the motor) can be influenced, for example, in an appropriate way in the following situations.

As a feedback for the speed control, the number of revolutions decreases below a nominal value, the delay t is then reduced to increase the main current.

As a starting current limitation, the starting current or the self-induction voltage Ua reaches too high values, the delay t is then increased in order to lower the main current lp. For the temperature stabilization, the temperature of the motor increases or that of individual parts thereof, the delay t is then increased. The number of revolutions of the motor can be determined over the switching frequency at the output of the phase control which can be eventually converted into an analog signal. At least one of the signals with a predetermined voltage at the output of the phase control is fed for this purpose (see FIG. 11, below the thick dashed line) over a capacitor Ca (approximately 0.1 $\mu$F) to a circuit which separates the charging/discharging currents of the capacitor Ca over two diodes D+, D− and feeds them by integration for charging two capacitors C+, C− (5–1000 uF) with parallel switched discharging resistors Rd.

The positive or negative charging of the capacitors C+, C− is proportional to the number of revolutions and each of these voltages can be used if need be for control purposes. If a potentiometer Pi is connected with the connection points between the diodes D+, D− and the capacitors C+, C− instead of the resistors Rd+, Rd−, a (feedback) signal adjustable from positive to negative can be obtained on its cursor, this signal being proportional to the number of revolutions and whereby this signal can be supplied to the input of the Schmitt-trigger ST, for example as feedback current.

In order to cause, for example, a smooth start of the motor, the values of the discharging resistor Rd or of the capacitors C−, C+ are selected in such a way that one of the capacitors C+, C+ reaches more slowly the voltage which corresponds to the number of revolutions of the motor. The signal drawn on the potentiometer Pl has a more slowly change after the switching-on of the motor and can thus be used to reduce progressively the delay t, thus to cause a smooth start.

Figure 12:
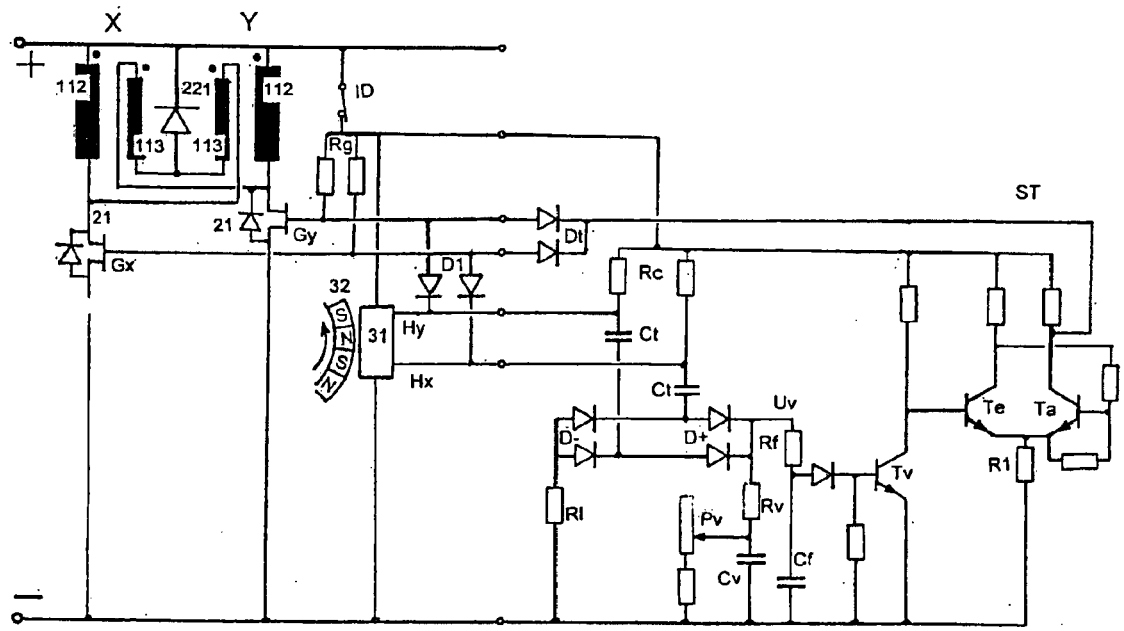
FIG. 12 is another exemplary electronic circuit used in accordance with the present invention.

FIG. 12 shows a circuit which makes possible a speed control and limitation due to the above described rise-delay for which this delay is controlled by means of a voltage which increases with the speed. As may be seen, this circuit has components (Rg, Dt, Rc, Ct, ST) which correspond to those of FIG. 11 and which have been described in connection with this figure.

However, the capacitors Ct are charged or discharged by means of two pairs of diodes D+, D−. The positive fraction of the currents which flow through the capacitors Ct, charges the integrating capacitor Cv over the diodes D+ or the resistor Rv so that their mean charging voltage is proportional to the number of revolutions. The resistor R1 serves to discharge the capacitors Ct over the diodes D−, when the respective outputs Hx, Hy of the Hall sensor 31 are situated on the minus potential. The capacity of this capacitor Cy and the resistor Rv are selected so that a voltage Uv arises on the cathode of the diodes D+, the mean value of which corresponds to the charging state of the integrating capacitor Cv (the number of revolutions), which however has a sufficient ripple (which mainly arises due to the voltage drop on the resistor Rv) in order to switch the transistor Tv within the phase duration. The resistor Rf and the capacitor Cf serve to filter eventual spurious components from this voltage Uv.

The charging state of the capacitor Cv, thus the build-up time of this voltage with the number of revolutions, can be adapted by means of the potentiometer Pv so that a speed control takes place by means thereof.

unction mode: When the number of revolutions of the motor remains under a value adjusted over the potentiometer Pv, the voltage on the capacitor Cv is low enough so that the transistor Tv does not become conducting even at the beginning of the phase (when the capacitors Ct are in the charging phase). If the number of revolutions of the motor increases, the voltage on the capacitor Cv increases and the voltage Uv on the cathode of the diode D+ too. (The resistors Rc, Rv and the capacitor Ct form a voltage divider).

The voltage Uv at this moment has the highest value because the capacitor Ct corresponding to the phase to be switched is discharged at the beginning of the phase. The transistor Tv becomes conducting at the beginning of the phase and locks the conducting polarized transistor Te of the Schmitt-trigger so that the output transistor Ta thus becomes conducting.

The gate electrodes of the power switches 21 so remain connected with the ground and the power switch is locked. If the voltage on the capacitor Ct increases after a delay t, the voltage Uv drops sufficiently so that the transistor Tv is locked. Thus, the output transistor Ta is also locked and the corresponding power switch 21 becomes conducting after the delay t. This process is repeated for each phase and the delay t takes up a value because of the described processes which corresponds to the adjusted number of revolutions. Because the charging voltage of the capacitor Cv influences the main current, the load state of the motor, which also depends on the number of revolutions, can be reduced or controlled by the increase of this voltage.

Here, further control influences can thus have a voltage increasing or reducing effect. As explained above, the status of the machine can be controlled by different parameters, depending on the gate electrodes Gx, Gy of the machine. Considering the circuits according to FIGS. 11–13, it is however more simple to obtain the functions described under a) to f) by influencing the control parameters not directly but at the input of the level switch ST or at the input of the driver components of the individual phases.

Figure 13:
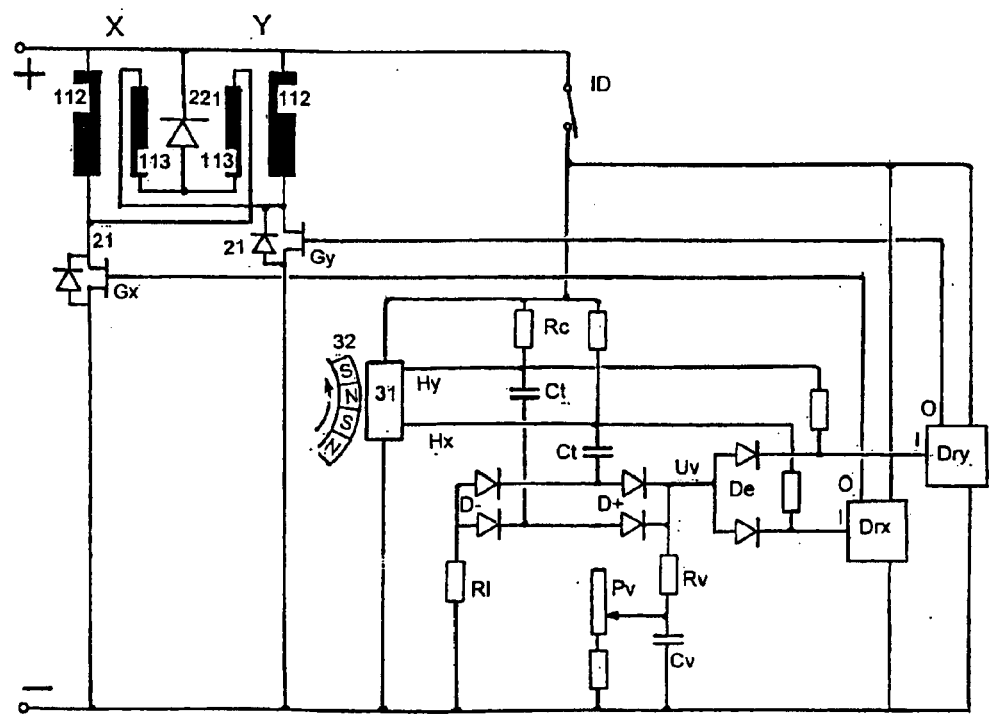
FIG. 13 is another exemplary electronic circuit used in accordance with the motor of the present invention for speed control.

FIG. 13 shows a further circuit where principally the function of the Schmitt-trigger has been realized with the inverting transistor according to FIG. 12 over two special control modules/hase (with threshold value switch function, here Mosfet driver, for example of the Micrel type (Mic 445 1B).

This alternative allows a better triggering because of shorter switching times, especially of bigger Mosfets or of parallel switched Mosfet groups. For this purpose, the circuit according to FIG. 12 has been changed as follows.

Respectively one Mosfet driver Dr/phase with the inverting output O connected to the gate replaces the Schmitt-trigger St and the inverting transistor Tv.

The diodes D1 and the pull-up resistors Rg for the gate electrodes are suppressed because now the outputs O of the two Mosfet drivers DrX, DrY charge or discharge the gate electrodes Gx, Gy directly over bidirectional currents.

The outputs of the Hall sensor 31 control the inputs of the Mosfet drivers in such a way that their outputs are "low". (The switch 21 is locked when the respective output of the Hall sensor 21 (phase commutation is "high".

The voltage Uv (analog speed signal with superposed alternating voltage fraction) has been supplied directly to the inputs of the Mosfet drivers Dr over the decoupling diodes De. The function is similar to that of the circuit according to FIG. 12.

When the output Hx of the Hall sensor 31 is "low", the output of the drive DrX is "high" and the motor starts in flip-flop mode (without control).

If the number of revolutions exceeds a predetermined limit, the voltage Uv increases and the inputs of the drivers (DrX) receive momentarily values of the voltage Uv which are above the input threshold of the drivers (approx. 1.5 V) so that their outputs (the gate electrodes) can become "high", only after the decay of this voltage, thus after a delay t, so that the motor works in power control mode.

From the prior art, it is known that a change between motor/generator function (brake) is caused by the phase shifting or commutation between two Hall sensors 31, 31'.

The energy recovery is useful for a driving gear of a vehicle or for an accumulator operated electric tool. The SR motors of the invention can without further measures produce, as a generator, a higher voltage than the voltage of the battery which allowed to reach the number of revolutions. Thus, the realization of the above mentioned function is particularly simple. This takes place most of the time with the switching-off of the power control function which is not much used in generator mode.

Eventually it is sufficient to interchange the output signals of the phase control (low instead of high) in order to reach a brake function by partial back charging of the battery.

What is claimed is:

1. Method for controlling the power of electronically switched two-phase reluctance machines with direct transmission of the demagnetization energy of a switched-off phase to the following phase, characterized in that the switching-on of the main current (lp) takes place delayed by a duration (t) after the phase commutation, wherein between the locking of the power switch (21X) of a phase (X) and the current conducting phase of the switch (21Y) of the following phase (Y), the self-induction voltage Ua, which arises by the switching-off of the phase (X) at the connection between the main winding (112X) and the power switch (21X), is supplied over a bypass diode (22) to a phase (Y, X, Y) which is not separated from the source of current, wherein the rise-delay time (t) of the main current depends on the number of revolutions and arises from the superposition of the complementary phase commutation signals with form similar signals which are phase-shifted with respect to the first ones by an angle (v) which is independent of the number of revolutions.

2. Method for power control according to claim 1, wherein the speed control and limitation takes place in that the delay (t) is independent from the number of revolutions.

3. Method for power control according to claim 1, wherein the phase-shifted signals of two digital Hall sensors 31, 31a arise because the sensors are mechanically displaceable.

4. Method for power control according to claim 1, wherein the mechanical displacement of a Hall sensor (31) or the electrical phase shifting of its output signal takes place depending on an output value including pressure, flow, temperature, current, or oscillation amplitude which comes from a coupled working device.

5. Method for power control according to claim 4, wherein the displacement of the Hall sensor (31) or the electrical phase shifting of its output signal changes the operating mode of the machine from a motor to a generator function.

6. Method for power control according to claim 4, wherein the phase commutation is adjusted depending on a current which traverses the windings (112, 113) by a current path which traverses the magnetic control circuit of the Hall sensor (31).

7. Method for power control according to claim 1, wherein the rise-delay time (t) of the main current (lp) takes place over an electronic time function element which is set into operation by the high/low transition of the phase control.

8. Method for power control according to claim 7, wherein the interruption of the main current within a phase is purposefully used to influence the current flow in this phase and in the following phase.

9. Method for power control according to claim 8, wherein a saw-tooth rotor position signal, used for the motor control, is gained by means of a profiled disk (32) which rotates in front of an analog Hall sensor (31c) polarized by the permanent magnet (33) which forms together with the latter a system of variable reluctance so that the output signal of the Hall sensor (31c) is a saw-tooth signal.

10. Method for power control according to claim 9, wherein the saw-tooth signal of the Hall sensor (31c) variable rectangular control signals are gained in that the level of the saw-tooth signals is compared with the adjustable trigger level (Uk) of a trigger (34).

11. Method for power control according to claim 10, wherein it uses an automatic phase symmetry method, for which a signal (Ud), which is proportional to the difference of the phase duration of both phases, serves for the variation of the trigger level (Uk) of a trigger (34) which corrects the phase width.

12. Method for power control according to claim 7, wherein the flip-flop signals of the phase control which have been obtained on outputs (Hx, Hy) of the phase control (31) charge alternately capacitors (Cl) corresponding to each phase during the high phase, whereby phase synchronized time decreasing voltage levels (Ur) arise due to their discharging during the following low phase in series with resistors (Rt), these voltage levels being referred to the phase beginning and being conducted to the input of a level detector (ST, Dr).

13. Method for power control according to claim 12, wherein respectively one driver component (Dr) is used per phase, outputs (l) of which show respectively one level detector each and outputs (O) of which switch gate electrodes (Gx, Gy) of the power switches (21) alternately from low to high potential.

14. Method for power control according to claim 1, wherein the control of the digital phase commutation is derived from the recognition of the phase position of an analog signal which can be phase-shifted if need be.

15. Method for power control according to claim 1, wherein the control functions of the machine are carried out by means of a differential Hall sensor, this Hall sensor being directly triggered by teeth (121) of a rotor (2) of the machine.

16. Method for power control according to claim 1, wherein two-phase reluctance machines which consist of two angle-offset, independently operative machine halves, characterized in that the bypass current (Ib) from the phases of a machine half is transmitted to the phases of the other machine half.

17. Method for power control according to claim 1, wherein the main current (Ip) is interrupted in any position (t2) within the phase duration for a short time (t3).

18. Method for power control according to claim 1, wherein the starting current limitation takes place by the interruption of the main current (Ip) when reaching an upper limit, whereby its switching-on again takes place after a short predetermined time or when a lower limit is reached.

19. Method for controlling the power of electronically switched two-phase reluctance machines with direct transmission of the demagnetization energy of a switched-off phase to the following phase, characterized in that the switching-on of the main current (Ip) takes place delayed by a duration (t) after the phase commutation, wherein the phase commutation signals positive or negative fractions are separated from which, by integration by means of capacitors (Cv) or resistors (Pv) slowly variable analog voltage signals are obtained which can be adjusted as nominal value and which are proportional to the number of revolutions of the motor.

20. Method for power control according to claim 12 or 19, wherein phase synchronized voltage levels (Ul) are superposed with analog voltage (Uv) over a resistor (Rv) which causes a ripple for adjusting the number of revolutions and are supplied to level switch (es) (ST, Dr) in such a way that it thus controls the number of revolutions of the motor from the time of the phase commutation to the reaching of a sawtooth voltage (Uv) which determines the rise-delay (t) of the power switches (21).

21. Method for controlling the power of electronically switched two-phase reluctance machines with direct transmission of the demagnetization energy of a switched-off phase to the following phase, characterized in that the switching-on of the main current (Ip) takes place delayed by a duration (t) after the phase commutation, wherein between the locking of the power switch (21X) of a phase (X) and the current conducting phase of the switch (21Y) of the following phase (Y), the self-induction voltage Ua, which arises by the switching-off of the phase (X) at the connection between the main winding (112X) and the power switch (21X), is supplied over a bypass diode (22) to a phase (Y, X, Y) which is not separated from the source of current, wherein the duty cycle of the power switches (21) of the phases (X, Y) is controlled over the phase difference of the output signals of two Hall sensors (31, 31a).

22. Method for power control according-to claim 21, wherein the desired direction of rotation ensues over the presetting of a starting sensor (31) and the speed control takes place over the phase difference between the starting sensor (31) and a second sensor (31a), whereby the phase difference is changed by the manual displacement of these sensors (31, 31a) or by the electrical phase shifting of the output signals.

23. Method for controlling the power of electronically switched two-phase reluctance machines with direct transmission of the demagnetization energy of a switched-off phase to the following phase, characterized in that the switching-on of the main current (Ip) takes place delayed by a duration (t) after the phase commutation, wherein between the locking of the power switch (21X) of a phase (X) and the current conducting phase of the switch (21Y) of the following phase (Y), the self-induction voltage Ua, which arises by the switching-off of the phase (X) at the connection between the main winding (112X) and the power switch (21X), is supplied over a bypass diode (22) to a phase (Y, X, Y) which is not separated from the source of current, wherein the optimization of the phase commutation (efficiency) takes place by the automatic correction of the main current (Ip) and/or of the bypass current (Ib) as well as of the path of the self-induction voltage (Ua) in direction of the minimal values or of the power draw of the motor.

24. Method for power control according to claim 23, wherein unavoidable peaks of the self-induction voltage (Ua) are absorbed by Ua depending voltage controlled conducting phases of the power switches (21).

25. Method for controlling the power of electronically switched two-phase reluctance machines with direct transmission of the demagnetization energy of a switched-off phase to the following phase, characterized in that the switching-on of the main current (Ip) takes place delayed by a duration (t) after the phase commutation, wherein between the locking of the power switch (21X) of a phase (X) and the current conducting phase of the switch (21Y) of the following phase (Y), the self-induction voltage Ua, which arises by the switching-off of the phase (X) at the connection between the main winding (112X) and the power switch (21X), is supplied over a bypass diode (22) to a phase (Y, X, Y) which is not separated from the source of current, wherein the control functions of the machine are carried out by means of a programmable Hall sensor (38d).

26. Method for controlling the power of electronically switched two-phase reluctance machines with direct transmission of the demagnetization energy of a switched-off phase to the following phase, characterized in that the switching-on of the main current (Ip) takes place delayed by a duration (t) after the phase commutation, wherein between the locking of the power switch (21X) of a phase (X) and the current conducting phase of the switch (21Y) of the following phase (Y), the self-induction voltage Ua, which arises by the switching-off of the phase (X) at the connection between the main winding (112X) and the power switch (21X), is supplied over a bypass diode (22) to a phase (Y, X, Y) which is not separated from the source of current, wherein important control and protective functions of the machine are carried out by the control of the power switches (21) for which their gate electrodes (Gx, Gy) are triggered as required over phase commutation, power control on/off, overvoltage and undervoltage protection, thermal switching-off, overcurrent and short-circuit as well as protection against inductive voltage peaks (Ua).

27. Method for power control according to claim 26, wherein the synchronization of the signals of the winding (49) takes place by the recognition of the form of the current and voltage paths in the connecting lines.

28. Method for power control according to claim 26, wherein the electric potentials of the gate electrodes (Gx, Gy) of the power switches (21X, 21Y) can be switched low independently from each other by the phase control (31) and/or by a level discriminator (ST).

29. Method for controlling the power of electronically switched two-phase reluctance machines with direct transmission of the demagnetization energy of a switched-off phase to the following phase, characterized in that the switching-on of the main current (lp) takes place delayed by a duration (t) after the phase commutation, wherein between the locking of the power switch (21X) of a phase (X) and the current conducting phase of the switch (21Y) of the following phase (Y), the self-induction voltage Ua, which arises by the switching-off of the phase (X) at the connection between the main winding (112X) and the power switch (21X), is supplied over a bypass diode (22) to a phase (Y, X, Y) which is not separated from the source of current, wherein for reluctance machines without stator with two independent rotors (1, 2), their field rotor (1) carries the power electronics (21, 22) and a part of the power control which receives the control signals from outside contactless by means of an axially mounted Hall sensor (39) which is triggered by a stationary winding (49).

30. Method for controlling the power of electronically switched two-phase reluctance machines with direct transmission of the demagnetization energy of a switched-off phase to the following phase, characterized in that the switching-on of the main current (lp) takes place delayed by a duration (t) after the phase commutation, wherein analog signals depending on the number of revolutions are used as negative feedback for influencing the starting behavior and the speed control of the motor.

* * * * *